United States Patent Office 2,932,481
Patented Apr. 12, 1960

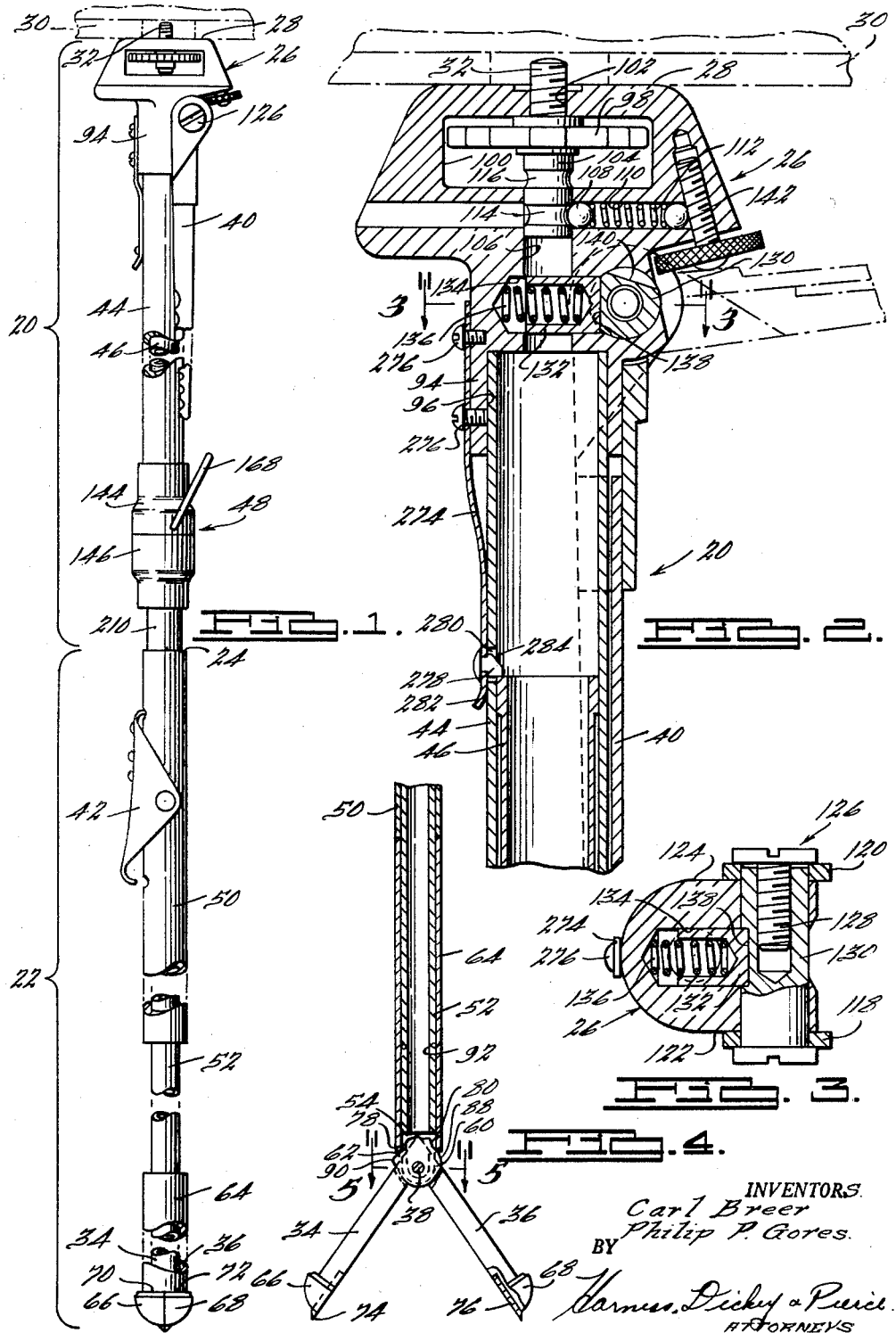

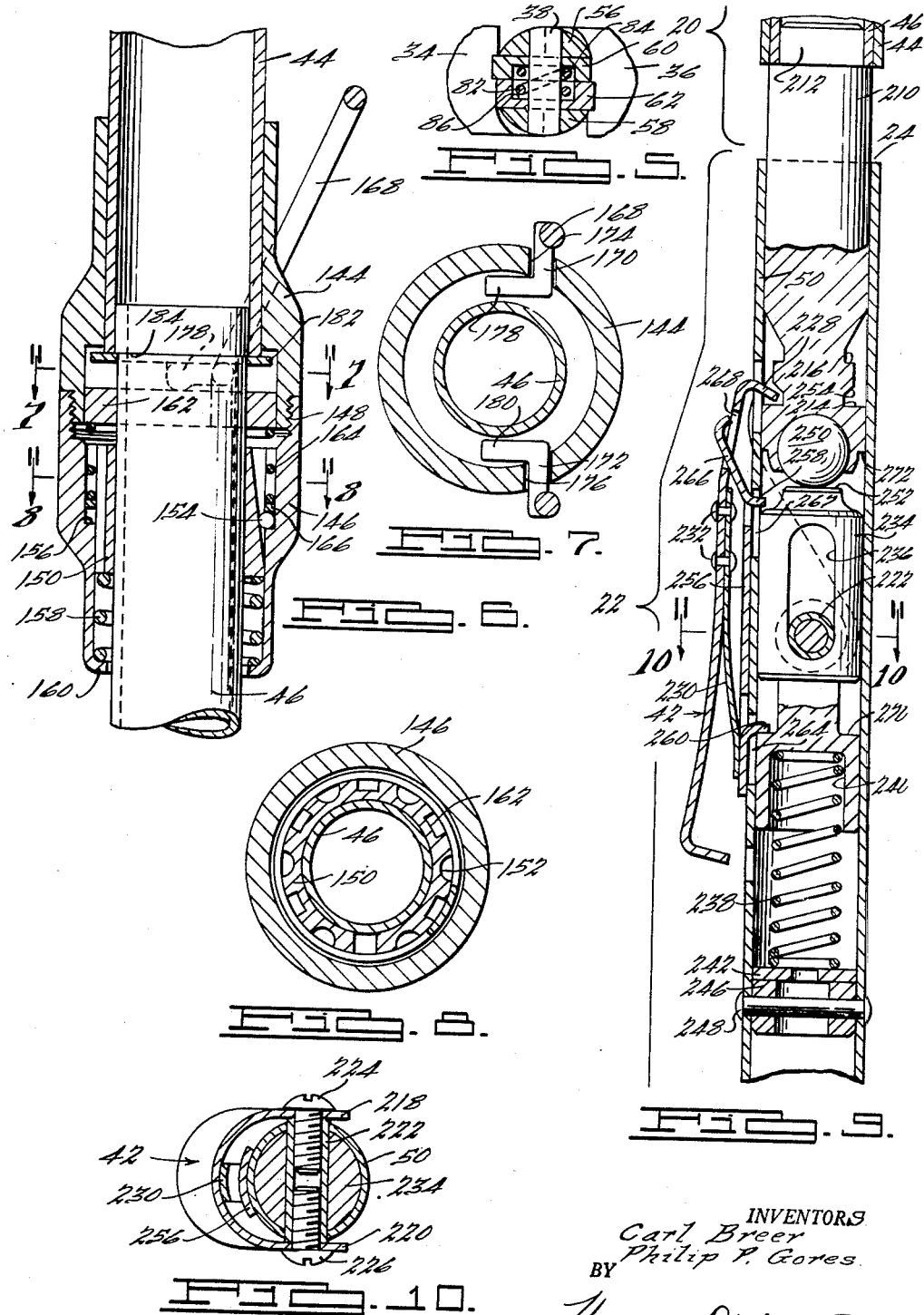

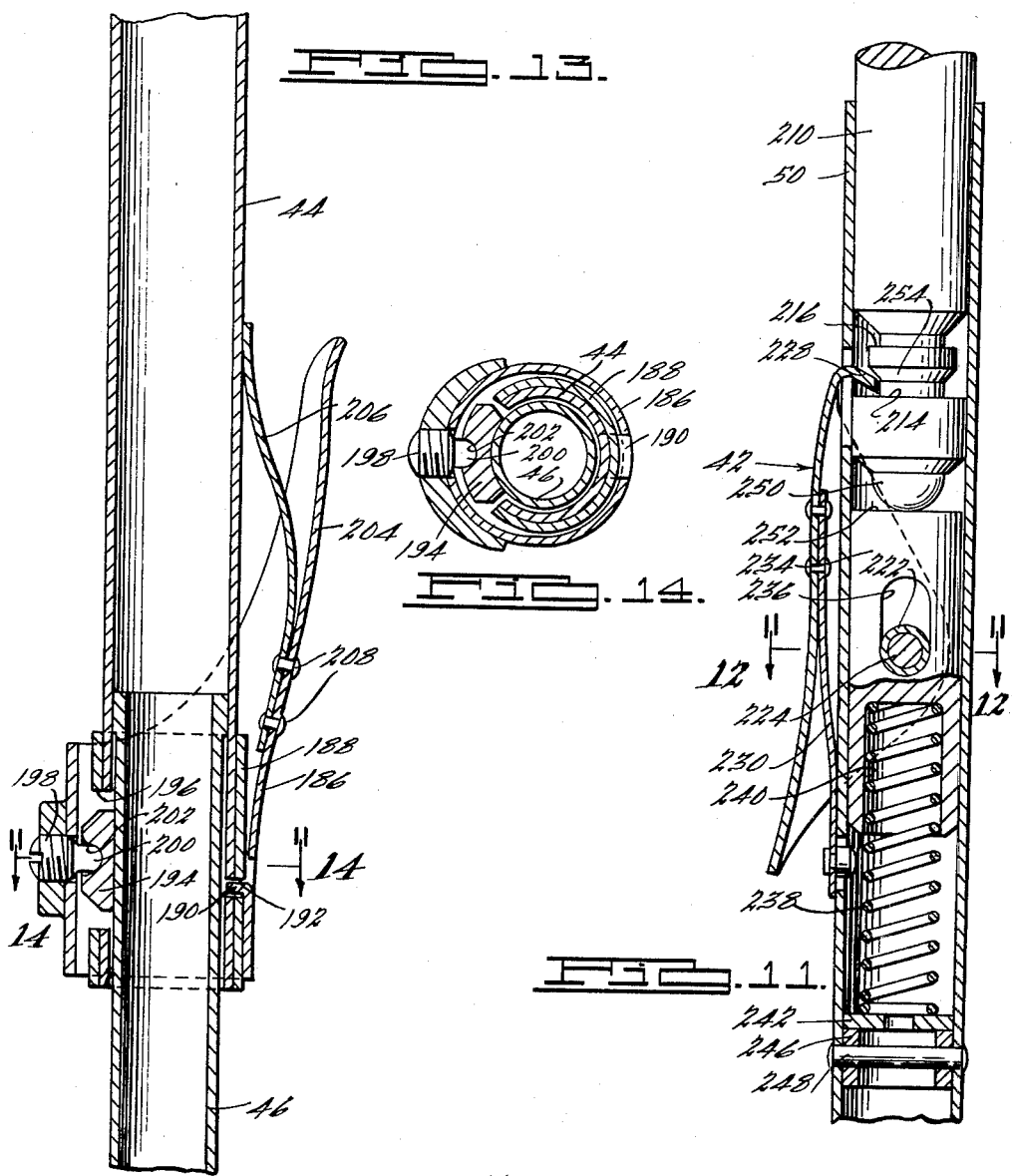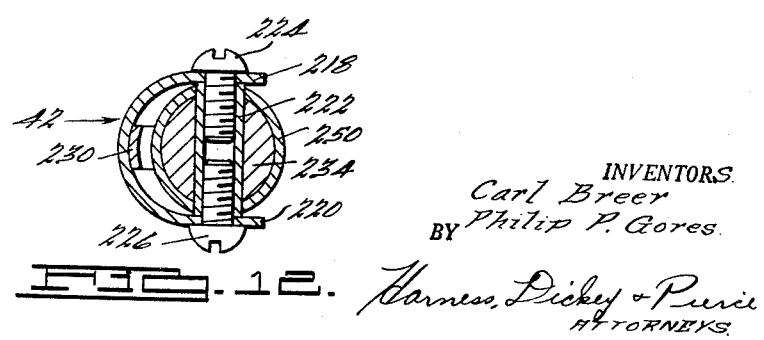

2,932,481

BIPOD CAMERA SUPPORT

Carl Breer, Pasadena, Calif., and Philip P. Gores, Detroit, Mich.; said Gores assignor to said Breer Application June 15, 1954, Serial No. 436,826

6 Claims. (Cl. 248—355)

This invention relates to a novel supporting staff for cameras and the like.

The ordinary collapsible tripod conventionally used for cameras is objectionable in several respects. For example, tripods cannot be erected and attached to the cameras quickly, and as a consequence it is often impossible for the user to take a picture using a tripod under circumstances requiring quick action. Furthermore, after most tripods have been erected, they are flimsy and shaky and care must be taken not to touch them during the picture-taking operation; otherwise, they jiggle the camera and ruin the picture. This objection also makes the tripod unsuitable for use in crowds because the legs thereof spread over a considerable area, and it is almost impossible to use such a support for taking pictures under conditions where hurrying passers-by are likely to step on or brush against the support. In addition to the above, the physical nature and construction of the tripod support makes it unsuited for use in a moving vehicle such as an automobile or train.

An important object of the present invention is to provide a camera support having telescoping sections that provide a strong rigid support for a camera.

Another object of the invention is to provide a camera support having pivoted prongs at the lower end thereof that afford an adequate purchase for the staff and that occupy a minimum of space.

Still another object of the invention is to provide a camera support of the above-mentioned character wherein the telescoping sections can be readily collapsed or disassembled to reduce the entire device to a size that fits readily into a conventional traveling bag or the like.

Yet another object of the invention is to provide a camera support of the above-mentioned character that can be easily and quickly adjusted as to length so as to provide a support best suited to the user and to the exigencies of the particular situation.

A further object of the invention is to provide a camera support of the above-mentioned character wherein the staff sections are relatively rotatable to permit panning or turning of the camera and that includes means for regulating the resistance offered by the support to such turning movement so as to enable the user to adapt the support for variations in the conditions of use.

Other objects and advantages of the invention will be apparent during the course of the following description.

In the drawings forming part of this specification and wherein like numerals are employed to designate like parts throughout the same:

Fig. 1 is a side elevational view of a camera support embodying the invention;

Fig. 2 is an enlarged, longitudinal sectional view of the upper portion of the support particularly illustrating the manner in which the camera head on the upper end of the device supports and is attached to a camera;

Fig. 3 is a transverse, sectional view taken on the line 3—3 of Fig. 2;

Fig. 4 is a longitudinal sectional view at the bottom of the support and particularly illustrating the bipod prongs which support the device;

Fig. 5 is a transverse sectional view taken on the line 5—5 of Fig. 4;

Fig. 6 is an enlarged, longitudinal sectional view through the clutch which holds the telescoping staff sections of the device in different axially adjusted positions;

Fig. 7 is a transverse sectional view taken on the line 7—7 of Fig. 6;

Fig. 8 is a transverse sectional view taken on the line 8—8 of Fig. 6;

Fig. 9 is an enlarged, longitudinal sectional view illustrating the section of the device that regulates the resistance to relative turning movement between the telescoping staff sections;

Fig. 10 is a transverse sectional view taken on the line 10—10 of Fig. 9;

Fig. 11 is a longitudinal sectional view showing a modified form of the mechanism illustrated in Fig. 9;

Fig. 12 is a transverse sectional view taken on the line 12—12 of Fig. 11;

Fig. 13 is a longitudinal sectional view showing a modified clutch suitable for use in place of the particular mechanism shown in Fig. 6; and Fig. 14 is a transverse sectional view taken on the line 14—14 of Fig. 13;

Considered in certain of its broader aspects, the camera support of this invention comprises separate upper and lower staff portions 20 and 22 adapted to be detachably interconnected as at 24 (Fig. 1). A camera head 26 is provided on the upper staff portion 20. A flat top surface 28 on the head 26 supports a camera, as shown generally at 30, and a threaded stud 32 carried by the head is adapted to be screwed into the mating threaded opening with which camera cases conventionally are equipped to hold the latter securely on the head. Prongs 34 and 36 attached to the lower staff portion 22 by a pivot 38 are adapted to be held together, as shown in Fig. 1, to provide a unipodal support for the staff or to be spread, as shown in Fig. 4, to provide a bipodal support therefor.

In use, the staff functions generally in the same manner as a conventional tripod to steady the camera. The prongs 34 and 36 are placed firmly on the ground or other supporting surface and the user then sights through the camera in the usual manner while taking a picture. It is possible to use the prongs in either the closed or open position while taking pictures, and means hereinafter described are provided for holding the same selectively in one position or the other. The desirability of using the supporting prongs in one position or the other will vary according to the exigencies of the particular situation. In general, it is better to use the prongs 34 and 36 spread as shown in Fig. 4 when the staff is supported upon a loose or uneven surface. Also, it is better to use the staff with the prongs 34 and 36 spread apart when taking certain types of pictures, as during vertical panning with a motion-picture camera, as the staff rocks freely about the pivot 38 while being held securely by the prongs. At the same time, the weight of the staff and camera together with any downward pressure exerted by the user lock the prongs 34 and 36 against the pin 38 to take up any rotational play between the parts.

It is desirable also to adapt the staff for use under conditions where it is not feasible to use the prongs 34 and 36. For example, when taking pictures from a moving vehicle such as an automobile or a train, much better pictures can be obtained if the staff is supported entirely by the user rather than on the floor of the vehicle. To this end, the head 26 is provided with a pivoted arm 40 that normally occupies an unobstructive position alongside the upper staff portion 20 as shown in Fig. 1. However, when the arm 40 is swung outwardly to the broken-line position shown in Fig. 2 it can be rested on the shoulder of the user to assist in holding the camera steady. The user can then hold the staff firmly in his hands with the lower end thereof free of the floor and the arm 40 resting on his shoulder and move his body freely while taking the picture as required to compensate to a large extent for the movement of the vehicle. When using the staff under these conditions, the lower staff portion 22 can be dispensed with, if desired.

For panning, the support can be operated very freely and smoothly with lever 40 (Fig. 1) supported on the shoulder of the user by natural bodily movement. Thus panning can be accomplished with practically no effort of sustaining weight either horizontally or vertically at 38 (Fig. 4) as a pivot. Further, by combining the action of the two pivot points one can point or pan the camera in any direction by simple body motion.

In order to provide for horizontal panning under conditions where the staff is supported on the prongs 34 and 36, the upper staff portion 20 is permitted to turn in the lower staff portion 22. It is, of course, desirable to hold the upper staff portion detachably fastened to the lower staff portion 22 under all normal conditions of use, and a latch 42 is provided for this purpose. The latch 42, hereinafter described in detail, holds the staff portions together while permitting one portion to rotate or turn freely relative to the other. Under certain conditions of use it is desirable that the upper staff portion 20 rotate freely on the lower staff portion 22 and under other conditions of use it is desirable to provide resistance to turning. The instant construction provides for either free or resistance turning of the upper staff portion.

When the staff is used with the prongs 34 and 36 resting on the ground it is necessary that the staff be extensible to position the camera at eye level, and this factor of course varies with the stature of the individual. Also, the length of the staff required to achieve the above result varies depending upon the nature of the supporting surface. For example, if the staff is supported on loose sand, it buries itself somewhat before obtaining a secure footing and this in turn requires that the staff be longer than usual. On the other hand, if the staff is supported on the side of a hill, for example, it would have to be shortened in order to assure maximum comfort and convenience in use. Manifestly, therefore, it is desirable, in order to make the device essentially universal in operation, to provide means for easily and quickly adjusting the length of the staff. This is accomplished according to the present invention by providing the upper staff portion 20 with telescoping sections 44 and 46 and a manually operable clutch mechanism 48 for holding the sections in a selected, axially adjusted position. Of course either of the staff portions 20 and 22 could be equipped with the telescoping structure but it is preferred to adapt the upper portion 20 in this manner in order to position the operating clutch 48 for maximum convenience. Also, by constructing the upper staff portion 20 in this manner, the entire weight in the lower portion 22 is made available for extending the staff. Thus, if it is desired to lengthen the staff it is merely necessary for the user to release the clutch 48 and pull the staff upwardly to the desired length. On the other hand, if it is desired to shorten the staff, the operator merely releases the clutch 48 and lowers the upper section until the desired length is achieved. All of these operations can be accomplished easily and quickly so that the staff can be adapted substantially instantly to the requirements of any particular situation.

More particularly, in connection with the prong supports 34 and 36, it will be observed that the lower staff portion 22 comprises an outer tubular member 50 and an inner member 52. The inner member 52 is here shown tubular in form, but it will be readily apparent that this member can be either of solid or tubular conformation. In any event the inner member 52 fits snugly within the tubular outer member 50 and extends a sufficient distance into the member 50 to provide a secure connection between the parts. Also, the two members 50 and 52 are fixedly and permanently interconnected as by press fitting the member 52 in the member 50.

As perhaps best shown in Fig. 1, a substantial portion of the inner member 52 extends from and beyond the outer member 50, and the lower end thereof is slotted as at 54 to provide spaced supporting arms 56 and 58 (Fig. 5) which embrace and pivotally receive the prongs 34 and 36. It should perhaps be noted at this point that the prongs 34 and 36 preferably are semicylindrical in transverse section; and when they are folded together, as shown in Fig. 1, for example, they collectively form a cylindrical section of the same size as the inner member 52. The upper terminal portions 60 and 62 of the prongs are flattened to fit snugly between the supporting arms 56 and 58, and, as shown in Fig. 5, the pivot pin 38 extends through the upper terminal portions 60 and 62 of the prongs and the supporting arms 56 and 58 to pivotally interconnect these parts.

A sleeve 64 is slidably mounted on the projecting portion of the inner member 52 and it is movable between a position abutting the outer member 50 (Fig. 4) and a position adjacent the lower ends of the prongs 34 and 36 (Fig. 1). In order to limit downward sliding movement of the sleeve 64, the prongs 34 and 36 preferably are formed at the lower ends thereof with enlarged head portions 66 and 68 defining shoulders 70 and 72 against which the sleeve butts in the extreme downward position. Also, the prongs 34 and 36 preferably are provided with hardened relatively sharp pins 74 and 76 which project slightly to assure a secure grip of the staff on the supporting surface. Manifestly, the sleeve 64 in its lowermost position holds the prongs 34 and 36 together as shown in Fig. 1.

In the interest of structure appearance the sleeve 64 preferably should be long enough to afford rigidity as a column and to cover the pivotal connection between the prongs and the inner member 52 when fully extended. When fully retracted, as shown in Fig. 4, the sleeve 64 exposes the pivot connection but extends slightly beyond the base of the slot 54 so that the extremities of the pronged terminals 60 and 62 are disposed inside the projecting portion thereof. It is a feature of this invention that the inner extremities of the prongs 34 and 36 which project into the sleeve 64 under these conditions are formed with stops 78 and 80 that engage the sleeve to prevent either of the prongs 34 and 36, when spread apart as shown in Fig. 4, from moving on the pivot 38 into axial alignment with the staff. When the prongs 34 and 36 are spread and the staff is vertical as shown in Fig. 4, the staff is free to rock a substantial distance back and forth on the pivot 38 as required for vertical panning, but the stops 78 and 80 engage the sleeve 64 to prevent the staff from being swung so far as to be in alignment with either of the prongs.

This construction assures that the device will always rest solidly on both of the prongs 34 and 36 and will prevent either of the prongs from moving into a dead-center position with respect to the staff. The occurrence of this contingency is undesirable for the reason that a single prong provides an unstable support for the staff. Any slightly lateral pressure tends to rock the prong from the dead-center position; and should this occur while the picture is being taken, the resulting jar would ruin the picture.

A coil spring 82 housed in confronting recesses 84 and 86 provided in the inner faces of the prong extensions 60 and 62 bears against the inner sides of the prongs to spread them automatically when the sleeve 64 is retracted on the staff member 52. Arcuate end surfaces 88 and 90 on the prongs 34 and 36 respectively engage the sleeve 64 to hold the latter in the retracted position. Also, suitable means such as the drag spring 92 preferably is provided to offer sufficient frictional resistance to movement of the sleeve that it tends to remain in any slidably adjusted position within its permissible range of movement. In order to close the prongs 34 and 36 it is necessary to bring them manually together and then advance the sleeve 64 to the position shown in Fig. 1. Conversely, in order to spread the prongs to provide a bipodal support for the staff it is necessary merely to retract the sleeve 64 to the position shown in Fig. 4. As soon as the sleeve 64 clears the pivot 38, the spring 82 automatically snaps the prongs apart.

The total length of the lower staff portion 22 preferably is such that it fits conveniently in a conventional traveling bag. Manifestly, it is desirable to hold the prongs 34 and 36 closed when the staff is packed in this manner, and, in addition, it is desirable to hold the prongs closed under any circumstances where unipodal support is desired for the staff. Under most conditions of use, however, the bipodal support afforded by the prongs in the spread position is most desirable.

Referring now to the upper staff portion 20 it will be observed that the camera head 26 is formed with a cylindrical lower portion 94 having a socket 96 into which the upper terminal portion of the outer staff section 44 is press fitted. This press fit holds the head 26 securely and permanently on the outer staff section 44 and joins these parts as an integral unitary assembly.

The threaded stud 32 actually is an upward integral extension on a hand wheel 98 disposed within an opening 100 provided in the head 26. The stud 32 extends upwardly through an opening 102 in the head 26, and a depending journal 104 also formed integrally on the hand wheel 98 in alignment with the stud is supported for rotation in a bore 106 provided in the lower portion of the head.

It is necessary of course that the stud 32 project upwardly above the top surface 28 of the head 26 in order to attach a camera to the staff in the manner hereinabove described, but it is desirable that the stud be retracted below the surface 28 when there is no camera attached to the staff. Retraction of the stud in the manner described protects the external threads thereof and prevents the stud from being damaged. Also, retraction of the stud leaves the top surface 28 unobstructed for use as a hand support if it is desired to use the staff as a cane.

In order to accomplish the above result, the bore 106 is deep enough to slidably and rotatably accommodate the journal 104, and the hand wheel 98 accordingly can be moved axially as well as rotatably. In Figs. 1 and 2, the hand wheel is shown in the fully raised position, but it will be readily apparent that it can be pushed downwardly to retract the stud 32 below the top surface 28. A ball detent 108 disposed in a side passage 110 and held in engagement with the journal 104 by a spring 112 enters an annual groove 114 in the journal to hold the hand wheel raised as shown in the drawing and enters a second groove 116 also provided in the journal to hold the hand wheel in the lowered position.

The arm 40 is provided at the attached end thereof with extensions 118 and 120 (Fig. 3) which snugly receive and flatly engage opposite essentially flat sides 122 and 124 of the head 26 and are fastened to the head by pivot 126 which permits the arm 40 to swing freely between the full- and broken-line positions shown in Fig. 2. The pivot 126 here shown is in the form of co-operating male and female screw elements 128 and 130. The female element 130 extends substantially entirely through the body 26 and extensions 118 and 120 as shown in Fig. 3, and the co-operating male screw element 128 is threaded therein to hold the parts assembled.

An over-center device is provided for holding the arm 40 in the two extreme positions. In the particular construction here shown, this device comprises a plunger 132 slidably mounted in a bore 134 extending laterally from and opening onto the female screw element 130. A spring 136 holds the plunger 132 in pressed engagement with the screw element 130. Also, pressure exerted by the spring 136 against the hinge pin 130 (Fig. 2) assures against any lost motion when panning. As perhaps best shown in Fig. 2, the element 130 is provided with angularly related flat sides 138 and 140 which move into register with and engage the adjacent end of the plunger 32 when the arm 40 is at the limits of its pivotal movement. Thus, when the arm 40 is folded against the staff, as shown by full lines in Fig. 2, the side 138 is in register with the plunger 132, and when the arm is raised to the broken-line position the side 140 is in register with the plunger. When the arm 40 is moved to either the folded or raised position, one or the other of the sides 138 and 140 moves into engagement with the plunger 132, and pressure exerted by the plunger against the confronting surface forces the arm to the extreme position.

The arm 40 preferably is curved in transverse section to accommodate itself to the form of the staff section 44, and the spring-loaded plunger 132 holds it in pressed engagement with the staff when in the folded position. Conversely, pressure of the spring-loaded plunger 132 against the surface 140 holds the arm in the extended position and thus prevents idle pivotal movement of the arm relative to the head in use which might ruin or reduce the quality of the picture being taken when the arm is resting on the shoulder of the user in the manner hereinabove described. An adjustable screw 142 carried by the head 26 is engaged by the arm 40 to limit outward position thereof, and the stop is adjustable to position the arm for maximum convenience.

The clutch 48 comprises upper and lower housing sections 144 and 146 threadedly connected at 148. As perhaps best shown in Fig. 6, the upper housing section 144 is press fitted or otherwise fixedly attached to the lower end of the outer staff section 44, and the lower portion of the housing section 144 extends below the staff section 44. The lower housing section 146 surrounds and loosely receives the inner staff section 46. Within the lower housing section 146 is a ring-shaped expansible and contractable clutch element 150 having a plurality of circumferentially spaced grooves 152 in the outer surface thereof, and balls 154 supported on a radial ledge 156 in the housing section 146 are received within the grooves. The balls 154 project inwardly beyond the inner wall of the housing section 146, and the bottom surfaces of the grooves 152 are inclined upwardly and inwardly as shown in Fig. 6 so that a binding action occurs between the balls and the clutch element 150 when the latter is positioned as shown in the drawings. A locking spring 158 confined between the clutch element 150 and an inturned flange 160 at the lower end of housing section 146 urges the clutch element 150 constantly into engagement with the balls 154. If necessary or desirable the clutch element 150 can be provided with a plurality of additional longitudinal slots or grooves 162 in order to make the same sufficiently flexible to grip the staff section 46 securely under the action provided by the locking spring 158.

In this connection it will be readily apparent that the spring 158 acting upwardly against the clutch element 150 presses the same against the balls 154 and the balls in turn act against the tapered bottom surfaces of the grooves 152 to constrict the clutch element tightly around the staff section 46 to prevent the latter from moving longitudinally within the outer staff section 44. Conversely, when the clutch element 150 is pressed downwardly against the action of spring 158 it disengages the balls 154 and the inherent resiliency of the element 150 causes it to expand automatically to release the staff section 46. The three-point contact of the clutch balls (Fig. 6), namely, the contact of two balls against grooves in part 150 and of one ball against the inside surface of the part 146 all in horizontal planes together with friction between the clutch element 150 and staff section 46, assures against torsional lost motion.

According to the present invention the clutch element 150 is released by a ring-shaped actuator 162 normally disposed within the upper housing section 144 around the lower staff section 46. The actuator 162 is slidable in the housing section and normally is spaced above the clutch element 150 by a spring 164 interposed between the actuator and a washer 166 surmounting and supported by the balls 154. Sliding movement is imparted to the actuator 162 by a manually operable lever 168. The latter is here shown in the form of a U-shaped bail disposed in embracing relation to the housing section 144 and having inwardly extending portions 170 and 172 journaled in openings 174 and 176 provided in the housing section. Within the housing section 144 the bail 168 is formed with laterally extending terminal portions 178 and 180 that bear downwardly on the actuator 162 at diametrically opposite sides thereof. The angular relation between the main body of the bail 168 and the terminal portions 178 and 180 is such that the bail normally is positioned in slightly angular spaced relation with respect to the main body of the staff (Fig. 6). In this connection it will be observed that the spring 164 acts through the actuator 162 to hold the terminal portions 178 and 180 normally pressed upwardly against an essentially flat ring 182 carried by and fixed to the lower end of the upper staff section 44. The ring 182 projects radially outwardly from the staff section 44 to provide a bearing surface for the terminal portions 178 and 180 and also extends inwardly of the staff section 44 to provide a stop which engages an annular shoulder 184 adjacent the upper end of the inner staff section 46 to limit downward axial movement of the lower staff section and to prevent the latter from pulling entirely out of the upper staff section 44.

Thus, in operation the spring 164 prevents the lever 168 from rattling, holds the actuator 162 spaced upwardly from the clutch element 150 whereby to assure complete freedom of movement and operation of the latter and acts downwardly against the washer 166 to hold the balls 154 in line. In order to release the clutch element 150 it is merely necessary to press the lever 168 inwardly toward the staff. This action causes the lever to turn on the journals 170 and 172 so as to press the extensions 178 and 180 downwardly on the actuator 162. Downward pressure thus exerted on the actuator 162 causes the latter to move downwardly against the action of spring 164 into engagement with the clutch element 150 and continued movement of the actuator moves the clutch element downward against the spring 158 to disengage the balls 154 and to release the lower staff section 46. As soon as the latter is released by the clutch element 150 it is freely axially slidable within the upper staff section 44 to permit the staff to be suitably adjusted as to length.

Reference is now had to Figs. 13 and 14 which show a modified clutch that is operative for the purpose of this invention, although it is in some respects less desirable than the preferred form hereinabove described. The modified clutch comprises a tubular band 186 that surrounds and loosely receives the upper staff section 44. If necessary or desirable a ferrule 188 can be provided around the terminal portion of the staff section 44 within the ring 186. The band 186 is retained on section 44 and is rockably fulcrumed by a tab 190 which extends inwardly through an opening 192. The tab 190 conveniently can be struck and bent inwardly from the material of the band itself. Within the band 186 opposite the fulcrum 190 is a clamping block 194 loosely received in an elongate opening 196 and bearing inwardly against the lower staff section 46. A set screw 198 carried by the band 186 has an inner rounded extension 220 received by a recess 202 in the wedge 194. An upward extension on the band 186 at one side thereof provides an operating handle 204, and a leaf spring 206 fastened to the inner surface of the handle by rivets 208 curves inwardly away from the handle and bears against the upper staff section 44 to press the handle outwardly and rock the band on the fulcrum 190.

By tilting the axis of the band 186 relative to the axis of the staff in the manner described, the wedge 194 is caused to bear against the lower staff section 46 so as to hold the latter securely against axial sliding movement relative to the upper staff section 44. Conversely, by pressing the handle 204 inwardly against the action of spring 206, the band 186 is moved to release the wedge 194 from the lower staff section 46 sufficiently to permit the latter to be telescopingly adjusted within the upper staff section 44. The movement of the handle 204 required to engage and release the wedge 194 is selectively controlled by the set screw 198.

Attention is now directed to Figs. 9 and 10 which show a preferred means for regulating the relative turning movement between the upper and lower staff portions 20 and 22. It will be observed in this connection that the upper staff portion 20 is provided with a rodlike extension 210 having a reduced upper terminal portion 212 which is press fitted into or otherwise securely attached to the inner staff section 46 of the upper staff portion 20. The extension 210 has the same external diameter as staff section 46 and for all practical purposes is simply an extension or continuation of the section.

As suggested, the two staff portions 20 and 22 can be separated from each other but they are normally detachably interconnected by the latch 42. To this end the extension 210 is snugly but slidably and rotatably received within the lower staff section 50 and is formed with a pair of axially spaced, radial shoulders 214 and 216 adapted to be engaged by the latch 42 as shown in Fig. 9 to hold the staff sections assembled. The latch 42 is relatively elongated and is formed with parallel side portions 218 and 220 (Fig. 10) which embrace the staff section 50 and bear inwardly against a tubular journal 222 extending diametrically through the section. Screws 224 and 226 hold the latch portions 218 and 220 fastened securely to the journal 222. As shown in Fig. 9, the journal holds the latch 42 spaced outwardly from the staff section 50 so that it is free to rock on the journal relative to the staff section to move the inwardly extending latching portion 228 formed at the upper end thereof into and out of engagement with one or the other of the shoulders 214 and 216. A leaf spring 230 fastened to the undersurface of the latch 42 by rivets 232 urges the latching portion 228 inwardly to engage the upper staff portion 20.

In order to support the upper staff portion properly for turning movement in the lower staff portion 22, a plunger 234 is mounted for sliding movement in the staff section 50 below the extension 210. An elongated slot 236 in the plunger receives the journal 222, and a spring 238 below the plunger holds the latter normally upwardly against the journal 222. The upper end of the spring 238 is here shown received within a socket or well 240 provided in the plunger and the lower end of the spring seats on a washer 242 which in turn is supported by a disk 246 fastened securely to the staff section 50 by a rivet 248. In practice the spring 238 should be strong enough to carry the weight without appreciable deflection of the heaviest camera that will likely be used on the support. Since it is desirable that the upper portion 20 turn freely in at least one position thereof relative to the lower staff portion 22, a hardened steel ball 250 is embedded in the lower end of the extension 210 and the plunger 234 is formed with a flat top surface 252 which seats the ball. The spring 238 acts through the plunger 234 to hold the latch 42 positioned to engage the upper staff section but with the latching portion 228 spaced slightly from the should 214 so as not to in any way interfere with free turning of the upper staff portion. Also, the ball 250 provides a free turning bearing which supports the upper staff portion for easy rotation. When the latch 42 is positioned to overhang the lower shoulder 214 the spring 238 is almost fully extended so that it exerts very little pressure against the ball 250 whereby the upper staff portion turns freely with little, if any, resistance.

In order to increase the resistance to turning of the upper staff section 20, it is pressed downwardly to force the extension 210 farther into the staff section 50. As this action occurs, the plunger 234 is forced downwardly against the action of spring 238 until the latch 42 engages the upper shoulder 216. In this connection it will be observed that the extension 210 is formed above the lower shoulder 214 with a downwardly tapered annular surface 254 which engages the latching extension 228 as the upper staff portion 20 is pushed into the lower staff portion 22 to push or cam the latch outwardly for engagement with the upper shoulder 216. The increased resistance offered by the compressed spring 238 when the latch is engaged with the upper shoulder 216 materially increases the resistance offered to turning of the upper staff portion 20 and thus achieves the desired result. With the latch 228 in the upper or friction groove 216 there is no lost motion at any connecting point in the structure from the ground up to the camera. This is an important feature in keeping a still or movie camera steady when pointing in any one direction. With the latch 228 applying full spring pressure against the upper groove surface 216, sufficient friction is applied without lost motion torsionally to hold the camera steady against hand motion of operating the shutter. And yet the friction is not too great to prevent smooth panning with the lever 40 on the shoulder of the user as is oftentimes desired when photographing quick action or in case of a sudden uncontrolled change in direction of the moving object being photographed.

The instant invention also includes a novel means for releasing the latch 42 from the upper shoulder 216 and engaging it with the lower shoulder 214 whenever it is desired to remove the resistance to turning of the upper staff section 20 and to provide again a free turning movement. According to the instant invention, the release is actuated by the simple expedient of pressing the upper one-half portion 20 farther into the lower staff portion 22 and then releasing the upper staff portion. This action automatically disengages the latch 42 from the upper shoulder 216 and engages it with the lower shoulder 214. The advantage of this operation is at once apparent. The user can adjust the staff to provide the desired relatively great resistance to turning of the upper staff portion 20 and then, with hardly an interruption and without the necessity of operating latches or the like, obtain once again a staff to a free turning condition simply by pressing downwardly for an instant on the upper staff portion.

More specifically, the above result is accomplished by a slide 256 under the latch 42 (Fig. 9) having a pair of inwardly extending lugs 258 and 260 which project into the staff section 50 through openings 262 and 264. The portion 266 of the slide above the upper lug 258 extends angularly outwardly and upwardly through an elongate opening 268 in the latch 42. The lower lug 260 is positioned to overlie and engage a shoulder 270 adjacent the lower end of the plunger 234, and the upper lug 258 is disposed between the extension 210 and the plunger 234 which engage with a shoulder 272 on the extension.

In describing the operation of the release, it is first assumed that the latch 42 is engaged with the lower shoulder 214 and that the slide 256 is positioned as shown in Fig. 9 with the lug 260 engaged by the shoulder 270. Then, when the upper staff section 20 is pushed downwardly to engage the latch 42 with the upper shoulder 216, the plunger 234 is pushed downwardly from the lug 260 and the shoulder 272 is moved into proximity to but not into engagement with the upper lug 258. Thus, during this operation, the slide 256 is not affected. However, when the extension 210 is pushed farther onto the staff section 50, the shoulder 272 engages the upper lug 258 to push the slide downwardly on the staff section 50. As the slide moves in this manner the inclined upper portion 266 thereof engages the latch 42 at the bottom of the slot 268 to force the latching element 228 thereof radially outwardly sufficiently to disengage the upper shoulder 216. In this connection it will be observed that the shoulder 216 is narrower than the lower shoulder 214 so as to provide clearance between the shoulder and the wall of the staff section 50 and to reduce the extent to which the latch 42 must be retracted in order to disengage the shoulder 216. Thereafter, when the upper staff portion 20 is released the slide 256 holds the latch disengaged until the plunger 234 is forced upwardly by spring 238 a sufficient distance to bring the shoulder 270 again into engagement with the lower lug 260. The spatial relationship of the parts is such that the upper shoulder 216 has moved upwardly past the latching element 228 by the time the shoulder 270 engages the lug 260. Continued upward movement of the plunger thereafter acts through the lug 260 to move the slide upwardly to its original position, and as the slide moves upwardly it releases the latch 42 so that the spring 230 can move the latching element 228 again into engagement with the shoulder 214 and adapt the staff again for free turning movement.

Fig. 11 shows a modified latch mechanism similar to the form illustrated in Fig. 9 but omitting the slide 256 and the automatic releasing action performed by the slide. In this form of the invention the latch 42 operates automatically to engage the shoulder 216 from the shoulder 214. However, in order to release the latch from shoulder 216 it is necessary to retract the latching element 228 by manually manipulating the latch 42.

The upper staff portion 20, when detached from the lower staff portion 22, also preferably is of a length which conventionally permits it to be packed in a conventional suitcase or the like but it is also desirable that the staff portion 20 be longer than its minimum length in normal use of the staff. To this end, means is provided for limiting inward telescoping movement of the inner staff section 46. As shown in Fig. 2, a leaf spring 274 is fastened to the head 26 by screws 276. The leaf spring 274 extends downwardly from the head 26 and the lower end thereof bears against the outer staff section 44. A stop 278 on the lower end of the leaf spring 274 extends inwardly through an opening 280 into the path of travel of the inner telescoping section 46.

In normal use, the staff section 46 can be retracted until it engages the stop 278 as shown in Fig. 2, but no farther. However, in order to shorten the device as for packing or the like the spring 274 is lifted from the staff to retract the stop and permit the staff section 46 to retract against the head 26. The terminal portion 282 of the spring 274 preferably is bent outwardly to facilitate disengagement of the stop 278.

In order to facilitate extension of the staff section 46 from the fully retracted position the stop 278 is provided with a beveled upper surface 284 which cams the stop 278 outwardly automatically when the staff section 46 is extended. However, it will be readily apparent that since the upper end of the staff section 46 moves beyond and disengages the stop 278, the latter snaps automatically into place to prevent retraction thereof beyond the stop.

Having thus described the invention, we claim:

1. A camera support having separate upper and lower staff portions, two-position means detachably interconnecting said portions permitting relative rotation therebetween, said means in one position providing relatively easy rotation between said staff portions and in another position providing relatively difficult rotation between said staff portions, and means for selectively adjusting said means to one or the other of said positions, one of said staff portions having inner and outer telescoping sections and including means for holding said sections in different axially adjusted positions.

2. In a camera support, an outer tubular staff section, an inner staff section axially adjustable in said outer tubular section and having a plurality of axially spaced annular shoulders, a manually operable latch individually engageable with each of said shoulders to hold said inner section in different axially adjusted positions, a plunger in said outer section engaged endwise by said inner section, a spring behind said plunger holding the same against said inner staff section for yieldably resisting inward telescoping movement of said inner section, said spring offering increasing resistance to said inner section as it moves into said outer section and as the latch moves successively from one shoulder to another and thereby effecting progressively increasing resistance to relative turning between said staff sections, and a slide on said outer section having portions projecting into the path of travel of said inner section and said plunger and a cam portion engageable with said latch to release the same from said inner staff section, one of said extensions being engageable by said inner section in one axially adjusted position thereof to actuate said slide and to release said latch and another of said extensions being engageable by said plunger in another axially adjusted position of said inner staff section to actuate said slide to engage the same again with said inner section.

3. In a camera support, an outer tubular staff section, an inner staff section axially adjustable in said outer tubular section and having a plurality of axially spaced annular shoulders, a manually operable latch individually engageable with each of said shoulders to hold said inner section in different axially adjusted positions, a plunger in said outer section engaged endwise by said inner section, a spring behind said plunger holding the same against said inner section for yieldably resisting inward telescoping movement of said inner section, said spring offering increasing resistance to said inner section as it moves into said outer section and as the latch moves successively from one shoulder to another and thereby effecting progressively increasing resistance to relative turning between said staff sections, and means operable by movement of said inner section to a predetermined axially adjusted position to release the latch from said inner section and operable by movement of said plunger to a predetermined position in said outer section to engage said latch again with said inner section.

4. In a camera support, an outer tubular staff section, an inner staff section axially adjustable in said outer tubular section and having a plurality of axially spaced annular shoulders, a manually operable latch individually engageable with each of said shoulders to hold said inner section in different axially adjusted positions, a plunger in said outer section engaged endwise by said inner section, and a spring behind said plunger holding the same against said inner section for yieldably resisting inward telescoping movement of said inner section, said spring offering increasing resistance to said inner section as it moves into said outer section and as the latch moves successively from one shoulder to another and thereby effecting progressively increasing resistance to relative turning movement between said staff sections.

5. In a camera support, a tubular staff section having a spring-loaded plunger therein, a second staff section mounted for sliding and rotative movement in said tubular section, said second staff section bearing endwise against said plunger and movable thereagainst to different axially adjusted positions, and means coactive with said second staff section to hold the same in each of said axially adjusted positions and operative in various of said adjusted positions to regulate relative turning movement between said staff sections while permitting such relative turning movement in all of said adjusted positions.

6. In a camera support, inner and outer telescoping staff sections axially adjustable one within the other, means interacting between said sections in one axially adjusted position thereof permitting easy relative rotation therebetween, means interacting between said sections in another axially adjusted position thereof offering increased resistance to but still permitting relative rotation therebetween, and means operable in still another axially adjusted position of said sections for rendering said second-mentioned means inoperative.

References Cited in the file of this patent

UNITED STATES PATENTS

| | | |
|---|---|---|
| 507,178 | Smith | Oct. 24, 1893 |
| 714,043 | Seitz | Nov. 18, 1902 |
| 721,425 | Clyde | Feb. 24, 1903 |
| 1,031,637 | Fischer | July 2, 1912 |
| 1,070,993 | Spjut | Aug. 19, 1913 |
| 1,112,513 | Wright | Oct. 6, 1914 |
| 1,364,169 | Wolff | Jan. 4, 1921 |
| 1,636,771 | Glaberman | July 26, 1927 |
| 1,745,845 | Ebbecke | Feb. 4, 1930 |
| 2,042,443 | Buckstone | May 26, 1936 |
| 2,051,969 | Shastock | Aug. 25, 1936 |
| 2,171,653 | Heitmann | Sept. 5, 1939 |
| 2,591,888 | Steffen | Apr. 8, 1952 |
| 2,628,854 | Gardner | Feb. 17, 1953 |
| 2,634,075 | Mayzel | Apr. 7, 1953 |
| 2,693,973 | Militano | Nov. 9, 1954 |
| 2,763,456 | Breer | Sept. 18, 1956 |
| 2,790,657 | Wilder | Apr. 30, 1957 |